G. W. BIGELOW & L. S. LINDSLEY.
CHEESE MANUFACTURE.

No. 182,405.

Patented Sept. 19, 1876.

Witnesses.
H. Shumway.
Clara Broughton.

Geo. W. Bigelow
& Lyman S. Lindsley
Inventors
By Atty

UNITED STATES PATENT OFFICE.

GEORGE W. BIGELOW, OF NEW HAVEN, CONNECTICUT, AND LYMAN SMITH LINDSLEY, OF EATON, NEW YORK.

IMPROVEMENT IN CHEESE MANUFACTURE.

Specification forming part of Letters Patent No. 182,405, dated September 19, 1876; application filed July 31, 1875.

*To all whom it may concern:*

Be it known that we, GEORGE W. BIGELOW, of Hew Haven, in the county of New Haven and State of Connecticut, and LYMAN S. LINDSLEY, of town of Eaton, in the county of Madison and State of New York, have invented a new Machine for Working Cheese-Curd; and we do hereby declare the following, when taken in connection with the accompanying drawings and the letters of reference marked thereon, to be a full, clear, and exact description of the same, and which said drawings constitute part of this specification, and represent, in—

Figure 1:
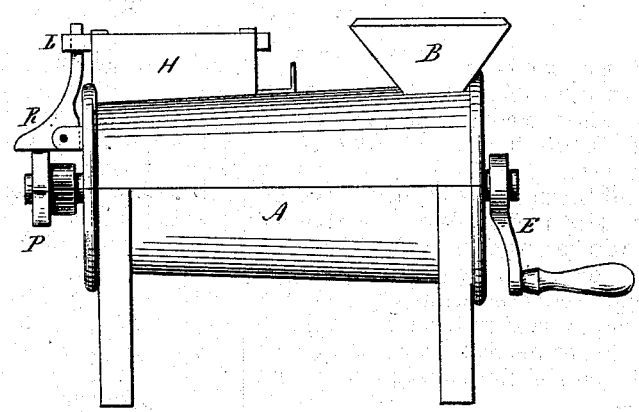
Figure 2:
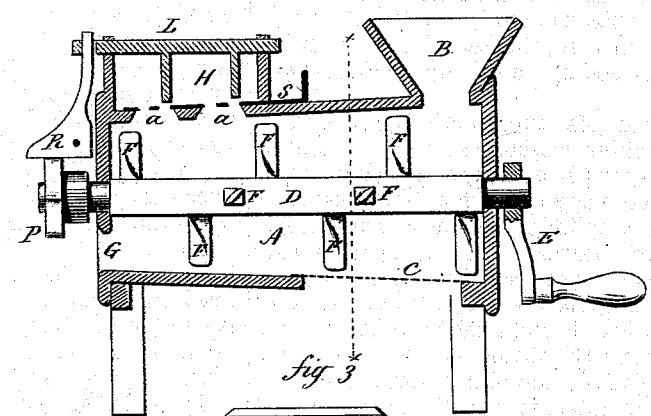
Figure 3:
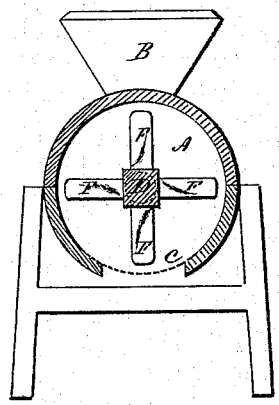

Figure 1, side view; Fig. 2, longitudinal section; Fig. 3, transverse section.

This invention relates to a machine for working or separating the curd from the whey in the manufacture of cheese. This work is usually performed by hand, and is a laborious process.

The object of this invention is the construction of a machine which, receiving curd and whey together, will discharge the curd separated from the whey ready for the press; and it consists of a cylinder, within which is a revolving spiral beater operating so that the curd and whey being received at one end, the curd will be broken, the whey drawn off, and the curd passing through the cylinder will be delivered, properly worked and free from the whey, as more fully hereinafter described.

A is the cylinder, preferably made in two parts, and so as to divide longitudinally, and also preferably of conical form, or so that the bottom at one end will be slightly higher than the bottom at the other end; and at the end of the cylinder where the bottom is lowest a hopper, B, is arranged as a convenient means for introducing curd and whey to the cylinder. At this end of the cylinder the bottom is perforated for a portion of its surface, as at C. Centrally through the cylinder a longitudinal shaft, D, is arranged in suitable bearings, and with means for applying power thereto to cause the shaft to revolve in any convenient manner—here represented as by a crank, E.

Spirally around the shaft B arms F are set, and these are formed so that their surfaces in incline toward the smaller or higher end of the cylinder, and so that the shaft, revolving in a mass of curd, will tend to work the curd from the hopper toward the other end. At this other end an opening, G, is formed for the discharge of the curd.

The curd is dipped from the tub and poured through the hopper B into the cylinder, the shaft at the same time revolving. The beaters break up the curd so as to free the whey, at the same time working the curd toward the discharge D, the whey passing out through the perforations C, or other suitable discharge.

In order to salt the curd, the second or salt hopper H is arranged upon the top of the cylinder, with openings $a$ through the bottom of the hopper into the cylinder. A mass of salt is placed in this hopper, and sifted through by a reciprocating or other agitator, L, actuated by a cam, P, through a lever, R. To gage the quantity of salt, a longitudinal slide, S, is arranged in the bottom of the hopper over the perforations $a$. This slide is perforated, and so as to register to a greater or less extent with the openings in the salt-hopper; therefore, as the curd is worked toward the discharge, the salt will be distributed upon it, and thoroughly mingled before the curd reaches the discharge. Passing out of the discharge, the curd is ready for the press.

The salting apparatus is not essential to the working of the curd, as the salting may be subsequently done.

We are aware that butter-workers consisting of a cylinder, with beaters revolving within, and with an aperture for the escape of the buttermilk at one end, are well known; but such a structure we do not claim, as a necessary element for a curd-cutter is a strainer on the bottom to allow the whey to escape, while the curd is forced through the cylinder to the aperture diagonally opposite its entrance.

We claim—

1. The combination of the cylinder A, constructed with the receiving-aperture B, the strainer C, for the escape of the whey in the bottom, the curd-outlet G; diagonally opposite the receiving-aperture, and the spirally-revolving beater, constructed and operating all substantially as specified.

2. In combination with the cylinder constructed with a receiving-aperture, a discharge-opening, and an outlet for the whey, combined with a series of spirally-set revolving beaters, operating to work the curd from the receiving-opening to the discharge, and a salt-hopper, with an agitator arranged therein to distribute the salt upon the curd within the cylinders, substantially as specified.

GEORGE W. BIGELOW.
   LYMAN SMITH LINDSLEY.

Witnesses to BIGELOW:
 JOHN E. EARLE,
 CLARA BROUGHTON.

Witnesses to LINDSLEY:
 E. C. PHILPOT,
 RACHEL BROWN.